United States Patent
Hayner

[11] Patent Number: 5,904,760
[45] Date of Patent: May 18, 1999

[54] REREFINED OIL OR HYDROFINISHED NEUTRAL OIL FOR BLENDING SUPERPAVE ASPHALTS WITH LOW TEMPERATURE PROPERTIES

[75] Inventor: Roger E Hayner, Russell, Ky.

[73] Assignee: Marathon Ashland Petroleum LLC

[21] Appl. No.: 08/697,385

[22] Filed: Aug. 23, 1996

[51] Int. Cl.⁶ .................................. C09D 195/00
[52] U.S. Cl. ........................................... 106/279
[58] Field of Search ................................. 106/279

[56] References Cited

U.S. PATENT DOCUMENTS

| | | | |
|---|---|---|---|
| 2,870,080 | 1/1959 | Illman et al. | 208/23 |
| 2,947,697 | 8/1960 | Vierk et al. | 252/55 |
| 2,970,099 | 1/1961 | Illman | 208/23 |
| 3,455,716 | 7/1969 | Loring et al. | 106/269 |
| 3,663,281 | 5/1972 | Fauber | 106/279 |
| 3,930,988 | 1/1976 | Johnson | 208/182 |
| 3,940,281 | 2/1976 | Corbett | 106/278 |
| 4,068,023 | 1/1978 | Nielsen et al. | 427/138 |
| 4,078,117 | 3/1978 | Hutchison | 428/446 |
| 4,250,021 | 2/1981 | Salusinszky | 208/181 |
| 4,381,992 | 5/1983 | Wood et al. | 208/179 |
| 4,724,247 | 2/1988 | Burton et al. | 524/128 |
| 5,034,119 | 7/1991 | Blackburn et al. | 208/309 |
| 5,098,556 | 3/1992 | Go et al. | 208/299 |
| 5,221,703 | 6/1993 | Ostermeyer | 524/68 |
| 5,331,028 | 7/1994 | Goodrich | 524/68 |
| 5,397,459 | 3/1995 | Butler | 208/179 |
| 5,437,717 | 8/1995 | Doyle et al. | 106/220 |
| 5,447,628 | 9/1995 | Harrison et al. | 208/179 |
| 5,476,542 | 12/1995 | Doyle et al. | 106/219 |
| 5,496,400 | 3/1996 | Doyle et al. | 106/220 |

FOREIGN PATENT DOCUMENTS

| | | |
|---|---|---|
| 0300284 | 1/1989 | European Pat. Off. . |
| 0380384 | 8/1990 | European Pat. Off. . |
| 2462459 | 2/1981 | France . |
| WO8808866 | 11/1988 | WIPO . |

OTHER PUBLICATIONS

An Overview of Lube Base Oil Processing, American Chem. Society, A. Sequeria, R&D Texaco, Inc., 23–28 (Aug. 1992), pp. 1286–1293.

Used Oil Issues and Opportunities, American Chem. Society, L. M. Teintze, Texaco, Inc., 23–28 (Aug. 1992), pp. 1356–1366.

*Primary Examiner*—David Brunsman
*Attorney, Agent, or Firm*—Richard C. Willson, Jr.; Richard D. Stone

[57] ABSTRACT

Mineral lubricant base oils (e.g., neutral oils) can be added to asphalt composition to improve low temperature properties at low addition rates (e.g., oil 1–5%). Rerefined oils (boiling above about 177° C. (350° F.)) have the same properties as virgin mineral lubricant base oils, but most rerefined oils are too dark in color to be used as lube oil base stocks. Their use in asphalt would be ideal as color is not a problem and they are much cheaper in cost than virgin base oils. This can permit disposing of rerefined motor oil. The resulting asphalt compositions exhibit important improvements in low temperature properties, resistance to thermal cracking and expanded useful temperature range.

26 Claims, 5 Drawing Sheets

REREFINED OIL OR HYDROFINISHED NEUTRAL OIL FOR BLENDING SUPERPAVE ASPHALTS WITH LOW TEMPERATURE PROPERTIES

CROSS REFERENCE TO RELATED APPLICATIONS

The present application relates to, and is useful with co-pending U.S. Pat. No. 5,601,697, filed Aug. 4, 1994.

BACKGROUND OF THE INVENTION

I. Field of the Invention

The invention relates to asphalt compositions and to process for the improvement of their properties. The invention further relates to modified asphalt compositions useful in a variety of applications, particularly paving asphalts, and to construction methods utilizing such compositions.

II. Description of the Prior Art

Asphalt based materials are used extensively in a wide variety of applications. For example, asphaltic material is widely employed as a primary ingredient in coating compositions for structures, in sealants, and in waterproofing agents. Asphalt compositions have been used in paving mixtures with considerable advantage for many years. Many manufactured roofing materials, such as roofing shingles, impregnated felts, tars, mastics, and cements are also based on asphalt and compositions thereof.

U.S. Pat. No. 3,930,988 to Johnson (Phillips) teaches the process for treating used motor oils for reduction in ash content and metals. Further treatment by filtration through absorbents and then hydrotreating renders an oil product suitable for reuse in lubricating stocks. This patent provides a process for preparing lubricating materials which may be suitable for use in the present invention but does not teach the significance of using lubricating stocks with asphalt for improvement in low temperature performance properties.

U.S. Pat. No. 4,250,021 to Salusinszky teaches a process for removing metals and water from used lubricating oils rendering a product suitable for refinery feedstocks, fuel oil, or as blend stock for other hydrocarbon products or as rerefining feedstock. The claims of the invention deal strictly with the process of treating used oil materials and the ingredients used therein. No mention is made relative to the present invention which finds particular advantage in using a predominately paraffinic lube stock as a diluent/plasticizer for enhancing the low temperature properties of asphalt paving compositions.

U.S. Pat. No. 4,381,992 to Wood et al. (Phillips) teaches the process for purification of used oil by removal of the ash forming components and then subjecting the material to vacuum fractionation. The patent discusses that such fractionation renders a bottoms material while too heavy for use as a lubricating oils, could be use as a gear oil or as an asphalt additive. No further mention of usefulness of the bottoms material is made. The claims of the invention deal only with the purification of used oil processes, a method for fractionating the same and in no form discuss the novel findings of our invention.

U.S. Pat. No. 5,098,556 to Go et al. (Lyondell) teaches the purification of white oils to remove color producing bodies detrimental to the acid treating process. The invention teaches the process for passing white oils through acid treated clay filtration to remove RCS (readily carbonizable substances) which render the oils undesirable for use. It does not teach the use of oils for improving low temperature performance of paving grade asphalts which is the novel claims of the present invention. The oils produced by this invention could be used in our present invention as alternatives to the specified hydrofinished neutral oils. However, their cost from the purification process would render them unattractive for use in asphalt.

U.S. Pat. No. 3,455,716 to Loring et al. (Sinclair) teaches the production of film forming coating compositions providing corrosion inhibiting properties. No mention is made in the invention of the usefulness in asphalt paving compositions for improvement of low temperature performance.

U.S. Pat. No. 2,970,099 to Illman (Shell) teaches the alkylation of asphaltenes for the improvement of weathering, viscosity-temperature slope, and sweating tendencies of asphalt compositions. The invention further comprises oxidation or air blowing of the asphalts in conjunction with alkylation. Further it teaches the use of 25 to 75 parts by weight of a mineral lubricating oil, well outside the range of usage within our invention, with the alkylated asphaltenes for use as roofing asphalts. Our present invention does not require alkylation, however the use of asphalts produced by the process of this invention may be used within our invention as the base asphalt. Illman does not teach the use of hydrofinished neutral oils for improvement of low temperature properties of paving asphalts.

U.S. Pat. No. 2,947,697 to Vierk et al. (Sinclair) teaches the production of protective wire rope lubricants comprising oil, polyethylene and oxidized asphalt. It does not teach the findings of the present invention for paving asphalts.

U.S. Pat. No. 2,870,080 to Illman et al. (Shell) teaches the production of an oil asphalt plastisol comprising a continuous oil phase in which a pulverized asphalt is suspended. Said composition of this invention is not homogeneous nor continuous until heated and fused at temperatures above the softening point of the asphalt component. Said asphalts in this invention will have 0–5 penetration and softening points of 82–116° C. (180–240° F.). The invention teaches the production of said asphalts by severely high steam distillation or solvent precipitation and said asphalts then being ground to a fine particle size and suspended in an oil carrier to form a plastisol with lower processing and handling viscosities until fused back into a continuous phase. The invention does not teach the novel findings of our present invention for producing low temperature grades of Superpave asphalts.

U.S. Pat. No. 5,397,459 to Butler (Exxon) teaches the low severity hydrotreating of used lube stocks which contain only low levels of additives such as industrial circulating oils. Such oils are required in low severity lubricating applications to produce lubricating basestock oils. This invention could produce oils suitable for use in our present invention. It does not teach the use of said oils with asphalts for low temperature performance improvements.

III. Problems Presented by Prior Art

Regardless of the particular manner of formation or application of the particular asphalt mixture, durability is an important matter in the case of most asphaltic materials. For instance, in the case of a paving asphalt composition, durability of the road surface is a primary concern. The degree and rate of hardening of the paving asphalt composition or cement during application and while in service (so-called "age hardening"), caused by an increase in viscosity of the asphalt mixture and gradual loss of flexibility, are factors affecting the durability of an applied surface. At least one worker in the art (i.e., Januschke, *Industrial Engineering Chemistry Product Research and Development,*

Vol. 10, 1971, 209–213) has concluded that the reaction of the asphalt composition with atmospheric oxygen is the principal cause of asphalt hardening in pavement. Accordingly, the retardation of age hardening has been the object of extensive study.

Conventional refined asphalts have been found through the implementation of the Strategic Highway Research Program(SHRP), now Superpave binder implementation to be incapable of meeting requirements for resistance to low temperature thermal cracking in certain climatic areas or conditions. Modification using various types of modifiers such as plastomers, elastomers, chemical gellants, and chemical modifiers do not fully satisfy the improvement in both high temperature rutting resistance and improved low temperature cracking resistance.

Conventional practice has been to add softer asphaltic compounds or aromatic oils or other additives to soften or plasticize the asphalt composition. In order to reach acceptable low temperature properties, excessive amounts of soft asphaltic materials or fluxes must be added. In addition, aromatic oils are normally required in such amounts that when used in combination with polymers can, through the action of the increased aromaticity from the oil, cause the level of polymer required to reach the desired level of rutting resistance to become undesirable from excessive cost rendering the composition not feasible for use as a paving composition.

As a result of the 1987 Intermodal Surface Transportation Efficiency Act (ISTEA), a $150 million research study was commissioned in which $50 million was spent towards asphalt research for improving asphalt pavements. As a product of that research which was concluded in 1992, the Strategic Highway Research Program(SHRP) produced what is now known as the Superpave Performance Graded Binder Specification in which asphaltic binders are graded or characterized according to their relative performance in resistance to rutting, shoving or deformation at high temperatures, fatigue at intermediate temperatures, and thermal cracking resistance at low temperatures. Asphalts which normally would be graded either under the penetration or viscosity specifications will now be graded as PG or Performance Graded binders. As such, their designation will be representative of their resistance at both high and low temperature, indicating their useful temperature range as a PG AA–BB where AA=high temperature resistance in degrees Celsius and BB is low temperature cracking resistance in minus degrees Celsius, i.e., PG 64–22 would prevent rutting up to 64° C. (147° F.) and low temperature cracking to a minus 22° C. (72° F.). Areas of high loading or slow or standing traffic as well as areas where temperature extremes can be experienced in excess of 86° C. (187° F.) between high and low temperature levels will require the use of modifiers to obtain the increased useful temperature range. As a result, it has been common to add or start with softer asphalts to reach low temperature properties while adding modifiers such as polymers to achieve high temperature rutting resistance. The use of aromatic oils has been included to also give low temperature properties. As such, extensive levels of polymer addition is required to regain high temperature properties, especially when using aromatic oils as their use tends to solvate the polymer to a higher degree and thus require a higher level of polymer to be used to obtain the desired property.

Notwithstanding the considerable previous efforts expended to provide asphalt compositions having improved low temperature cracking resistance, and to provide a method of improving asphalt durability, there has remained a continuing need, particularly with paving asphalts, for improved compositions and methods. The invention addresses this need.

SUMMARY OF THE INVENTION

I. General Statement of the Invention

According to the invention, addition to asphalt compositions of mineral lubricant base oils (MLBO) preferably hydrofinished (HF) neutral oils, more preferably 100–325 neutral oil, gives a distinct improvement in low temperature properties at low addition rates. Rerefined oils (boiling above about 175° C. (350° F.)) have the same properties as the 325 hydrofinished (HF) virgin base oil. Most rerefined oils are too dark in color to be used as lube oil base stocks but their use in asphalt would be ideal as color is not a problem and they are much cheaper in cost than virgin base oils, such as 325 HF. This also provides a new means to dispose of rerefined motor oil made by solvent extraction, distillation, etc., of used motor oil. This material is also suitable for blending with solvent deasphalting (SDA) bottoms as an alternative to the aromatic extract and it may not require as much of either 100–325 HF oil or rerefined oil to get the required reduction in viscosity.

Accordingly, in one embodiment, the invention relates to a novel modified asphalt composition containing, a low temperature crack inhibiting level or stabilizing amount of, a mineral oil lubricant basestock obtained from the conventional refining of crude petroleum, with or without modification additives such as polymers, chemical gellants, antioxidants, and to compositions containing such modified asphalts. Generally, the modified asphalt compositions will comprise (a) about 0.1 to about 50% of a mineral lubricating oil basestock, and (b) about 0 to about 20% of a polymer modifier, and (c) about 0 to about 5% of a chemical gellant and (d) about 50 to about 99% of an asphalt obtained from conventional vacuum distillation, solvent refining, or naturally occurring mineral sources, e.g., Trinidad Lake asphalt. Asphalt paving compositions of such exhibit a distinct improvement in low temperature properties, in their resistance to thermal cracking and fatigue as defined by the use of the new Superpave Performance Graded (PG) Asphalt Binder Specifications. AASHTO MP1. Mineral oil lubricant base stocks can be added at considerably lower levels to obtain the desired properties in comparison to addition levels required with fluxes (soft vacuum distillation residues) or aromatic oils. MLBO use also improves and reduces the requirement level for polymers to provide high temperature performance capabilities. When used in conjunction with air blown asphalts, MLBOs also improve low temperature performance properties without excessive sacrifice of high temperature PG grade performance, e.g., ruffing resistance.

FEEDS

Asphalts:

Asphalts for use in the present invention are not narrowly critical and can be any available asphalts. A typical paving asphalt mixture comprises a mixture of components, principal ingredients of the paving asphalt mixture being an asphalt composition or cement and aggregate or aggregate material. In such mixtures, the ratio of asphalt composition to aggregate material varies, for example, according to the aggregate material type and the nature of the asphalt composition. As used herein, the terms "asphalt composition", "asphalt cement" or "asphalt binder" are understood to refer to any of a variety of organic materials, solid or semi-solid at room temperature, which gradually liquify when heated, and in which the predominate constituents are naturally occurring bitumens, e.g., Trinidad Lake, or residues commonly obtained in petroleum, synthetic petroleum, or shale oil refining, or from coal tar or the like. For example, vacuum tower bottoms produced during the refining of conventional or synthetic petroleum oils is a common residue material useful as asphalt composition. A "paving asphalt composition", "paving asphalt cement", or "paving asphalt binder", accordingly is an asphalt composition or asphalt cement having characteristics which dispose the composition to use as a paving material, as contrasted, for example, with an asphalt composition suited for use as a roofing material. "Roofing asphalts", for example, usually have a higher softening point, and are thus more resistant to flow from heat on roofs, the higher softening point generally being imparted by air blowing processes by which they are commonly produced. Paving asphalt mixtures may be formed and applied in a variety of ways, as well understood by those skilled in the art. For example, the paving asphalt composition and the aggregate can be mixed and applied at elevated temperatures at the fluid state of the paving asphalt composition to form the pavement or road surface. See particularly U.S. Pat. No. 5,580,376 to Hayner.

Mineral Lubricating Oils:

The manufacture of mineral lubricant base oils consists of five basic steps: 1) distillation, 2) deasphalting to prepare the feedstocks, plus optionally 3) solvent or hydrogen refining to improve viscosity index (VI), 4) solvent or catalytic dewaxing to remove wax and improve the low temperature properties, and/or 5) clay or hydrogen finishing to improve the color, stability and quality of the base oil stocks. Many processes are available to prepare mineral lubricant oils are known to those skilled in the art and may be employed in the present invention.

Rerefining of used lubricant base stocks can and may include all or in part of the above processes utilized to prepare virgin lubricant base oils. The processes usually provide a blend of light overhead components, lubricant oils, and a residue bottoms material. Several processes commonly known to those skilled in the art may be utilized to prepare compositions useful in the present invention. See particularly compositions described in the patents listed under prior art, above.

Polymer Modifiers:

The polymers used for modifying asphalts are well-known to those skilled in the art and comprise: Styrene Butadiene (SB), diblock polymers, Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide, e.g., those described in U.S. Pat. No. 4,393,155 to Garrett; Glycidyl-containing ethylene copolymers in U.S. Pat. No. 5,331,028; or Crumb Rubbers.

Gellants:

Similarly, the gellants are not narrowly critical and can include: chemical gellants such as metallic soaps formed by the neutralization of fatty acids and/or rosin acids; organoclays, e.g., bentonites, kaolin clays, etc.; hydrogenated castor oils; oligomers; siloxanes; or others well-known to those skilled in the art or included in the patent or other literature.

Antioxidants:

Though not narrowly critical, preferred antioxidants are an oxidation inhibiting or stabilizing amount of a composition selected from metal hydrocarbyl dithiophosphates, and mixtures thereof, and a composition selected from antioxidant butylated phenols, and mixtures thereof, in a specified ratio to each other, as described more fully hereinafter. Preferably, the components are added so that the asphalt composition comprises from about 0.1% to about 5.0% of a composition selected from metal hydrocarbyldithiophosphates, and mixtures thereof, and from about 0.1% to about 5.0% of a composition selected from antioxidant butylated phenols, and mixtures thereof, in a specified ratio to each other, as described more fully hereinafter. Most preferably, metal hydrocarbyl dithiophosphate component employed is a mixture of such dithiophosphates, and the metal hydrocarbyl dithiophosphate component is supplied in an amount of from about 0.1% to about 2.0%. The antioxidant butylated phenol is preferably supplied in a range of from about 0.1% to about 2.0%. In yet a third and most preferred embodiment, the invention relates to a novel oxidation resistant asphalt pavement or composition comprising an aggregate or aggregate material and from about 1.0% to about 10.0% of the novel modified asphalt composition described herein.

Hydrocarbon Solvents:

The hydrocarbon solvents can be any which are capable of reducing the viscosity of the asphalt. Preferred solvents include: mineral spirits; naphthas; kerosenes; and fuel oils.

Emulsifiers:

The emulsifiers include anionic or cationic or nonionic emulsifiers. Those particularly preferred are those described in U.S. Pat. No. 4,393,155 to Garrett (6162AUS).

Temperature:

While not narrowly critical, sufficient heat is necessary to maintain the asphalt composition in the molten state, sufficiently fluid to allow proper mixing and pumpability.

Pressure:

Pressure is optional and atmospheric pressure will be preferred.

Batch or Continuous:

While the invention will most commonly be practiced as a batch process, continuous processing with continuous mixing of the ingredients, e.g., fed directly into transport trucks, can be utilized.

COMPOSITIONS

In one embodiment, the invention relates to a novel modified asphalt composition containing a low temperature cracking and intermediate temperature fatigue improvement additive of (a) a composition selected from virgin or rerefined mineral lubricating oil base stocks, (b) an elastomeric and/or plastomeric polymer modifier composition and combinations thereof, (c) a chemical gellant, (a), (b), and (c) being all or in part present in the composition containing such modified asphalts. Generally, the modified asphalt compositions of the invention comprise (a) from about 0.1 to about 50% of a composition selected from virgin or rerefined mineral lubricating oil base stocks and mixtures thereof, and from about 0.0 to about 25% of a composition selected from elastomeric and/or plastomeric polymer modifiers and combinations thereof, and (c) from about 0.0 to about 10% of a chemical gellant selected from metallic soaps formed from the neutralization of fatty and rosin acids, organoclays, bentonite clays, hydrogenated castor oils, oligomers, siloxanes, or others well known to those experienced in the art. Unless indicated otherwise, all compositions percentages given herein are by weight, based upon the total weight of the composition. As indicated, the virgin or rerefined mineral lubricating oil basestock may be present as a mixture of such compositions where more than one viscosity, pour point, or viscosity index(VI) are present. The virgin or rerefined mineral lubricating oil base stocks are preferably present in an amount from about 0.1% to about 30%. The elastomeric and/or plastomeric polymer modifiers and combinations thereof are preferably present in an amount from about 0.0 to about 20%. The chemical gellant is more preferably present in an amount from about 0.0 to about 7%. All percents herein are by weight of total composition.

PROCESSES

The invention, in a second embodiment, relates to a process or method of improving the low temperature cracking and intermediate temperature fatigue resistance of an asphalt composition comprising blending with said asphalt composition, at a temperature sufficient to liquefy said asphalt composition, a virgin or rerefined mineral lubricating oil basestock or mixtures thereof, an elastomeric and/or plastomeric polymer modifier or combinations thereof, a chemical gellant(s) in a specified ratio to each other, as described more fully hereinafter. Preferably, the components are added so that the asphalt composition comprises from about 0.1 to about 50% of a composition selected from virgin or rerefined mineral lubricating oil base stocks or mixtures thereof, from about 0.0 to about 25% of an elastomeric and/or plastomeric polymer modifier and mixtures thereof, and from about 0.0 to about 10% of a chemical gellant in a specified ratio to each other as described more fully hereinafter. Most preferably, the virgin or rerefined mineral lubricating oil basestock component employed is supplied in an amount from about 0.1 to about 25%, the elastomeric and/or plastomeric polymer modifier and mixtures thereof are supplied in an amount from about 0.0 to about 20%, and the chemical gellant and mixtures thereof are supplied in an amount from about 0.0 to about 7%. All percentages are percent by weight of the total composition.

Asphalt Emulsions:

In a third and more preferred embodiment, the invention relates to a novel low temperature cracking and intermediate temperature fatigue resistant asphalt emulsion composition comprising a virgin or rerefined mineral lubricating oil basestock or mixtures thereof in an amount from about 0.1 to about 25%, a elastomeric and/or plastomeric polymer modifier in an amount from about 0.0 to about 25%, and 0.1 to about 10% of an emulsifier consisting of anionic, cationic or nonionic compositions commonly known to those skilled in the art, and water in amount from about 1.0 to about 90%. Preferred combination of the emulsion ingredients chosen to produce rapid set(RS), medium set (MS) or slow set(SS) as well as high float (HF) versions according to particular agency specifications under which they are to be supplied.

Asphalt Pavement:

In a fourth and most preferred embodiment, the invention relates to a novel low temperature cracking and intermediate temperature fatigue resistant asphalt pavement or composition comprising an aggregate or aggregate material and from about 1.0% to about 10.0% of the novel modified asphalt composition described herein.

In more particular embodiments, the invention is directed to specific methods of applications and compositions therefor, such as a novel roof compositions, crack sealants, coatings, moisture proofing agents and sound deadners.

II. Utility of the Invention

More particularly, the invention relates to novel modified asphalt compositions characterized by improved low temperature performance properties and resistance to thermal cracking, expanded useful temperature interval range, and to a process for producing such novel asphalt compositions.

DETAILED DESCRIPTION OF THE INVENTION

Any suitable asphalt composition or cement may be employed for producing the modified asphalt compositions of the invention. For example, industrial asphalts used for coatings, sealants, roofing materials, adhesives, and other applications may be used. Paving grade asphalt compositions, however, are employed in the preferred embodiment of the invention. Asphalt compositions may be derived, as indicated, from any well known bituminous or asphaltic substance obtained from natural sources or derived from a number of sources such as petroleum, shale oil, coal tar, and the like, as well as mixtures of two or more of such materials. Typical of such asphalts are the straight run asphalts derived from the atmospheric, steam and/or vacuum distillation of crude oils, or those asphalts derived from solvent precipitation treatments of raw lubricating oils and their fractions. Also included are the thermal or "cracked" asphalts which are separated as cracker bottom residues from refinery cracking operations and the asphalts produced as byproducts in hydro refining operations. A preferred asphalt is the vacuum tower bottoms that is produced during the refining of synthetic or petroleum oils. The asphalt may be treated or modified before use in the invention; so called "blown" or "oxidized" asphalts are preferred in roofing asphalt compositions but may be employed for paving applications when modified according to the invention. As indicated, for paving applications, any suitable paving grade asphalt may be employed for the compositions of the invention. Such paving grade asphalt compositions are often referred to as viscosity, penetration graded, or performance graded (PG) asphalts having penetrations up to 400 as measured by ASTM method D5. Preferred asphalts are the performance graded asphalts such as PG 46-40, PG 46-34, PG 46-28, PG 52-40, PG 52-34, PG 52-28, PG 52-22, PG 58-40, PG 58-34, PG 58-28, PG 58-22, PG 64-40, PG 64-34, PG 64-28, PG 64-22, PG 70-40, PG 70-34, PG 70-28, PG 70-22, PG 76-40, PG 76-34, PG 76-28, PG 76-22, PG 82-34, PG 82-28, or PG 82-22. The PG in the title referring to Performance Graded, the first numeric designation referring to the binders high temperature rutting or deformation resistance temperature range limit, and the last numeric designation referring to the binders low temperature thermal cracking resistance temperature limit. Complete specification requirements are outlined in specifications under AASHTO MP-1-93 Performance Graded Asphalt Binder Specification. AASHTO is the designation for the American Association of State and Highway Transportation Officials.

The virgin or rerefined mineral lubricating oil base stocks employed in the invention are known to be selected from solvent neutral oils, bright stocks, cylinder oils, and naphthene pale oils. (reference paper published in ACS Preprints volume 37, no. 4, Aug. 1992 "An Overview of Lube Base Oil Processing", Avilino Sequeira, Texaco Inc. R&D) solvent neutral oils (SNO's) are vacuum distilled paraffinic base oils that are refined for VI appreciation and aromatics removal. They are also dewaxed for pour point reduction and hydrogenated for stability. These base oils are characterized by high API gravity, flash point, aniline point, and VI. Bright stocks and cylinder oils are residual base oils manufactured from paraffinic and naphthenic vacuum residua. Bright stocks can be manufactured utilizing propane deasphalting, solvent extraction or hydrogenation, and solvent or catalytic dewaxing. Cylinder oils are manufactured using propane deasphalting with solvent dewaxing sometimes utilized to improve pour point. Naphthenic pale oils are vacuum distilled naphthenic base oils that are refined for aromatics removal and dewaxing is generally not required. Rerefined oils may be obtained from any of numerous processes which are not narrowly critical for this applications. Bottoms from the rerefining process can be employed for the invention but are not desirable due to their potential to contain hazardous levels of lead, arsenic, chromium, or cadmium, halogens, and polynuclear aromatic compounds. Further, lubricant additives such as dispersants, detergents and the like are retained in the bottoms material and can interfere with the efficiency of polymers, gellants, or emulsifiers.

Elastomeric or Plastomeric polymer modifiers or mixtures thereof may be employed. As used herein, the term "elastomeric" refers to a composition or compound which is a member of the class of polymers known as block copolymers. They can be chosen from either diblock, i.e., Styrene Butadiene(SB), or triblock, i.e., Styrene Butadiene Styrene (SBS), Styrene Isoprene Styrene(SIS), Styrene Polyethylene Styrene(SEBS), or random block copolymers such as SBR latexes or natural rubber latexes(neoprene). Recycled Crumb Rubber elastomers may also be utilized. As used herein, the term "Plastomeric" refers to those polymers normally chosen from either polymers or copolymers which tend to stiffen a mixture but do not offer an elastic or elastomeric benefit. Such modifiers are normally chosen from polyethylene, oxidized polyethylenes, ethylene vinyl acetate, ethylene terpolymers, and others commonly available under the trade names Elvax, Elvaloy, Polybuilt, Vestoplast, as well as many others commonly known to those skilled in the art. The composition of the invention may contain either or both of the polymer modifiers to tailor high temperature rutting and fatigue resistance to a specific grade requirement.

Chemical gellants may be used if desired and are normally chosen from compositions comprising soaps of resin and fatty acid mixtures as outlined in U.S. Pat. No. 4,874,432 to Kriech et al., assigned to Asphalt Materials or as outlined in recent patents (U.S. Pat. No. 5,437,717; U.S. Pat. No. 5,476,542; and U.S. Pat. No. 5,496,400) to Doyle et al., which concern improvements to that of Kriech, and U.S. Pat. No. 5,221,703 to Ostermeyer et al. Further, common gellants such as stearates and metallic soaps commonly used in the grease-making processes as well as the use of bentonite clays or amine treated or organoclays may be used for the present invention to control high temperature grading performance.

Table A summarizes preferred, more preferred and most preferred parameters of the process of the invention.

TABLE A

| | | PROCESS | | |
|---|---|---|---|---|
| Parameter | Units | Preferred | More Preferred | Most Preferred |
| Ingredients | | Asphalt Oils Polymer Others | Asphalt Oil Polymer | Asphalt Oil |
| Mixing Order | | Asphalt Oil Polymer | Asphalt Oil Polymer Emulsifier, etc. Water | Asphalt Oil Polymer Gel, antioxid. Water |
| Mixing Shear | — | Medium | Med.–high | High with polymer add. |
| Temp | ° F. ° C. | 100–400 35–205 | 150–390 65–200 | 250–375 120–195 |
| Pressure | | Optional | Optional | Optional |
| Batch, Continuous | — | Batch, Continuous | Batch, Continuous | Batch, Continuous |

Table B summarizes preferred, more preferred and most preferred parameters of the composition of the invention.

TABLE B

| | | COMPOSITIONS | | |
|---|---|---|---|---|
| Elements | Units | Preferred | More Preferred | Most Preferred |
| Asphalts | wt. % Type | 50–99 refined, natural & reconstituted oxidized | 70–99 refined or reconstituted | 80–99 vac. distill. |
| Min. Oil Lub. Base Stock | wt. % Type | 0.1–20 waste oils, solv. neutrals, rerefined, or arom. extracts | 0.5–15 solv. neutral or rerefined, arom. extract | 1–10 solv. neutral or rerefined lube base stocks |
| Polymers | wt. % Type | 0–20 PE, EVA, Oxidized PF, SB, SBS, SIS, SBR, SEBS, acrylamides | 0.5–15 SB, SBS, SBR SIS | 1–6 SB, SBS |
| Gellants | wt. % Type | 0–10 stearates, tall oil soaps, clays, ligomers | 0.5–8 stearates, tall oil soaps, clays, organo | 0.5–6 metal stearates no soap of tall oil fatty acid |
| Antioxidants | wt. % Type | 0–10 butylated phenols, amines, nickelates, etc. | 0.1–5 butylated phenols | 0.2–3 butylated phenols/metal hydrocarbyl-dithiophosphate |
| Solvent | wt. % | 0–90 | 0.5–50 | 1–20 |

TABLE B-continued

COMPOSITIONS

| Elements | Units | Preferred | More Preferred | Most Preferred |
|---|---|---|---|---|
| | Type | organic solvent | nonchlorinated organic solv. | diesel, #2 fuel oil, kerosene, naphthas |
| Emulsifiers | wt. % | 0–20 | 0.1–10 | 0.2–5 |
| | Type | clay, anionic, cationic, nonionic | anionic, cationic, nonionic | anionic, cationic |
| Water | wt. % | 0–80 | 0.5–50 | 1–30 |

Table C summarizes preferred, more preferred and most preferred parameters of the apparatus of the invention.

TABLE C

APPARATUS

| Parameter | Units | Preferred | More Preferred | Most Preferred |
|---|---|---|---|---|
| Vessel | | Kettle | Tank | Tank with in-line high shear mixer |
| Mixer | | Stirrer | High shear mixer | In-line static mixer or in-line blender |
| Circulation | | Mixer only | | Circulating pump with tank mixer |

DESCRIPTION OF THE PREFERRED EMBODIMENTS

EXAMPLE 1

Figure 1:
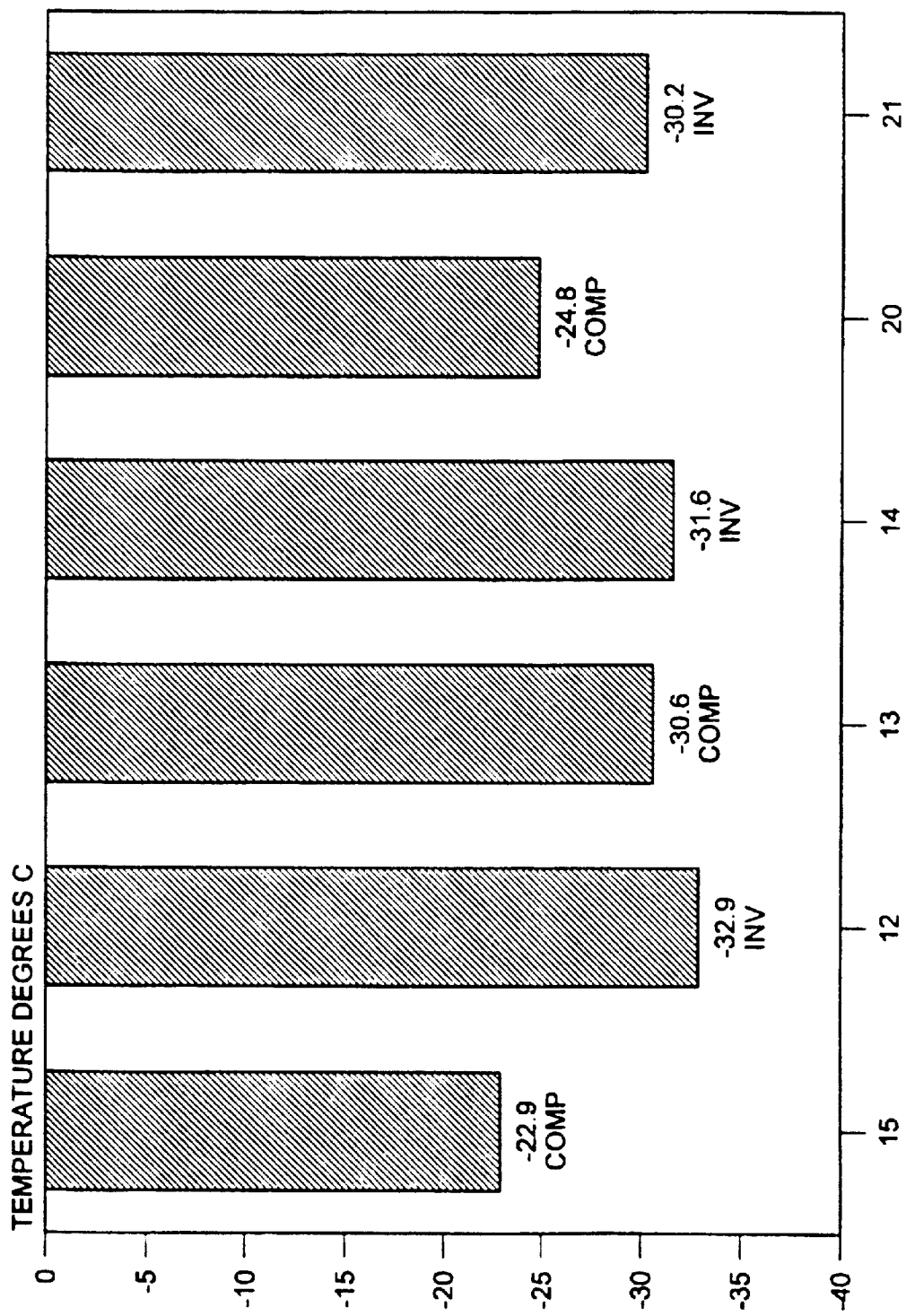
FIG. 1 is a plot of AC-5 viscosity graded asphalt cement/oil modifier showing Examples 12–15 without polymer and with linear SBS polymer versus "pass temperature" (the minimum degrees C at which the formulation passes the thermal cracking test (M value and stiffness) and (upper end of bar) the maximum degrees C at which the formulation passes the rutting test). The "PG" ratings in Table 1 show the useful temperature range for each of the formulations in degrees C, e.g., 58.5–35.6 means the formulation can be used from 58.5° C. down to –35.6° C. pavement temperature.
Figure 2:
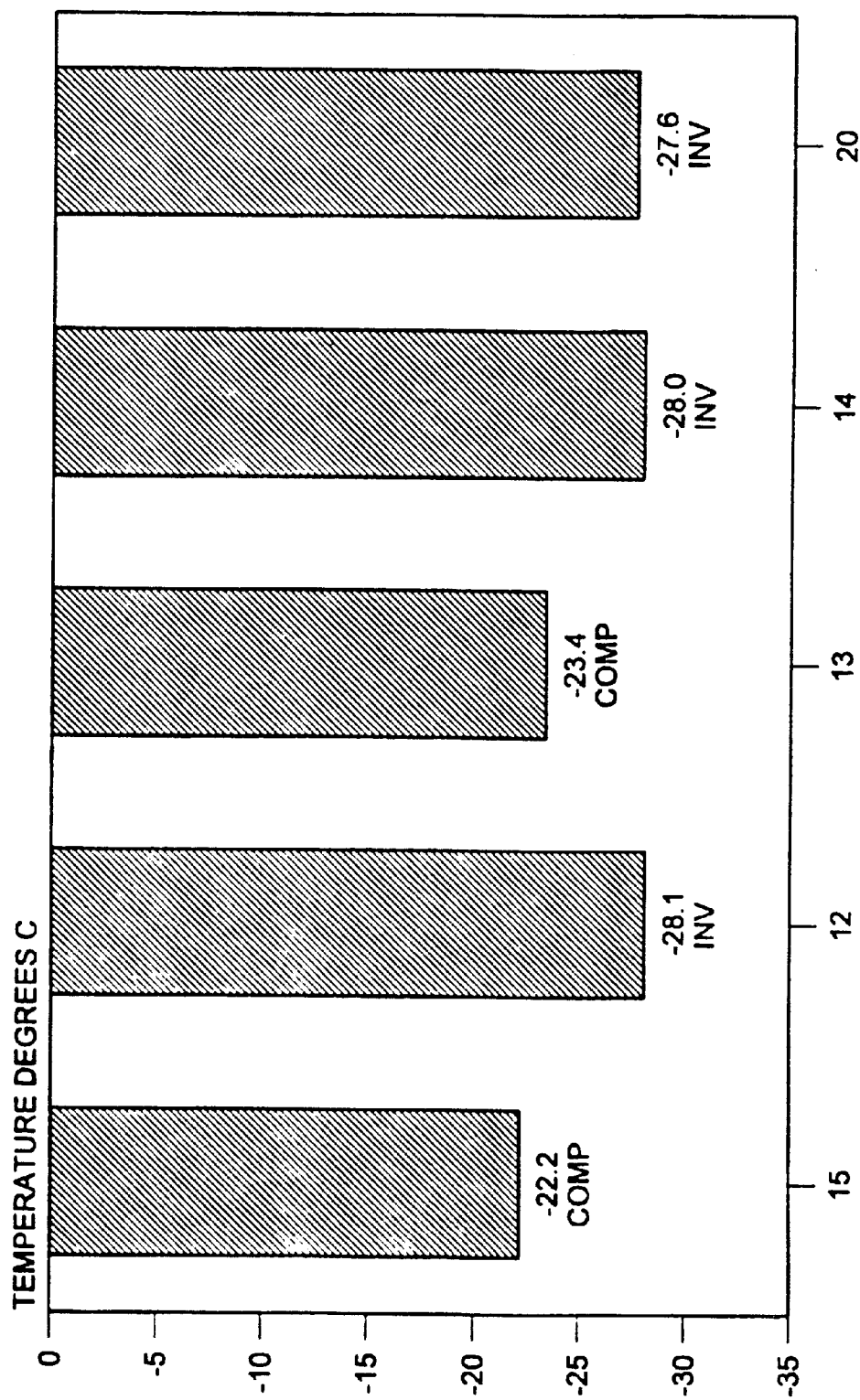
FIG. 2 is a plot of air-blown PG 70 performance graded asphalt binder/oil modifier showing results of Examples 3–5, 16 and 17 and their respective low temperature grading.
Figure 3:
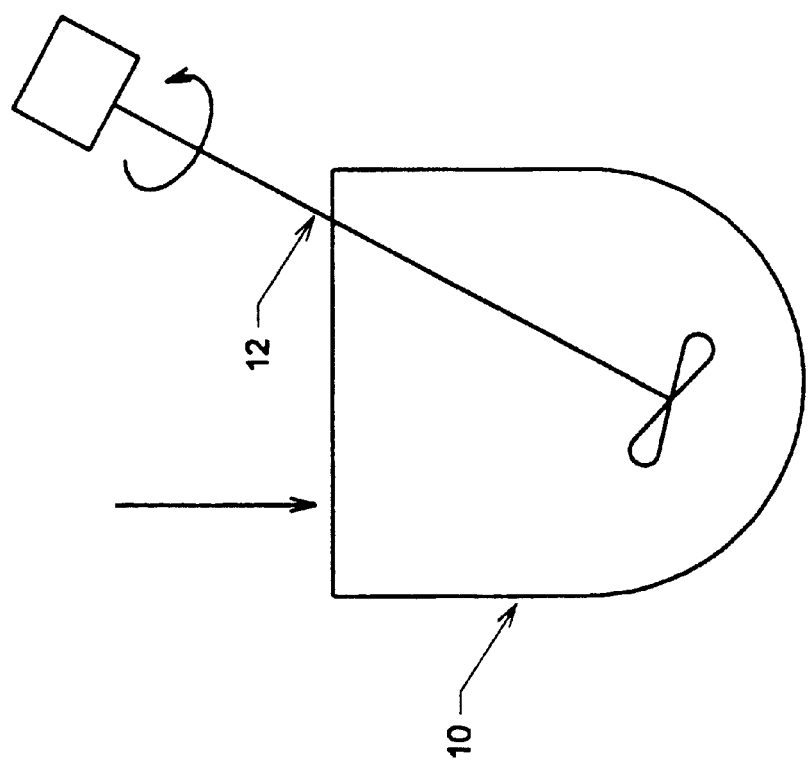
FIG. 3 shows a simple kettle 10 mixer 12 to which the ingredients are added and mixed together to form the finished asphalt composition.
Figure 4:
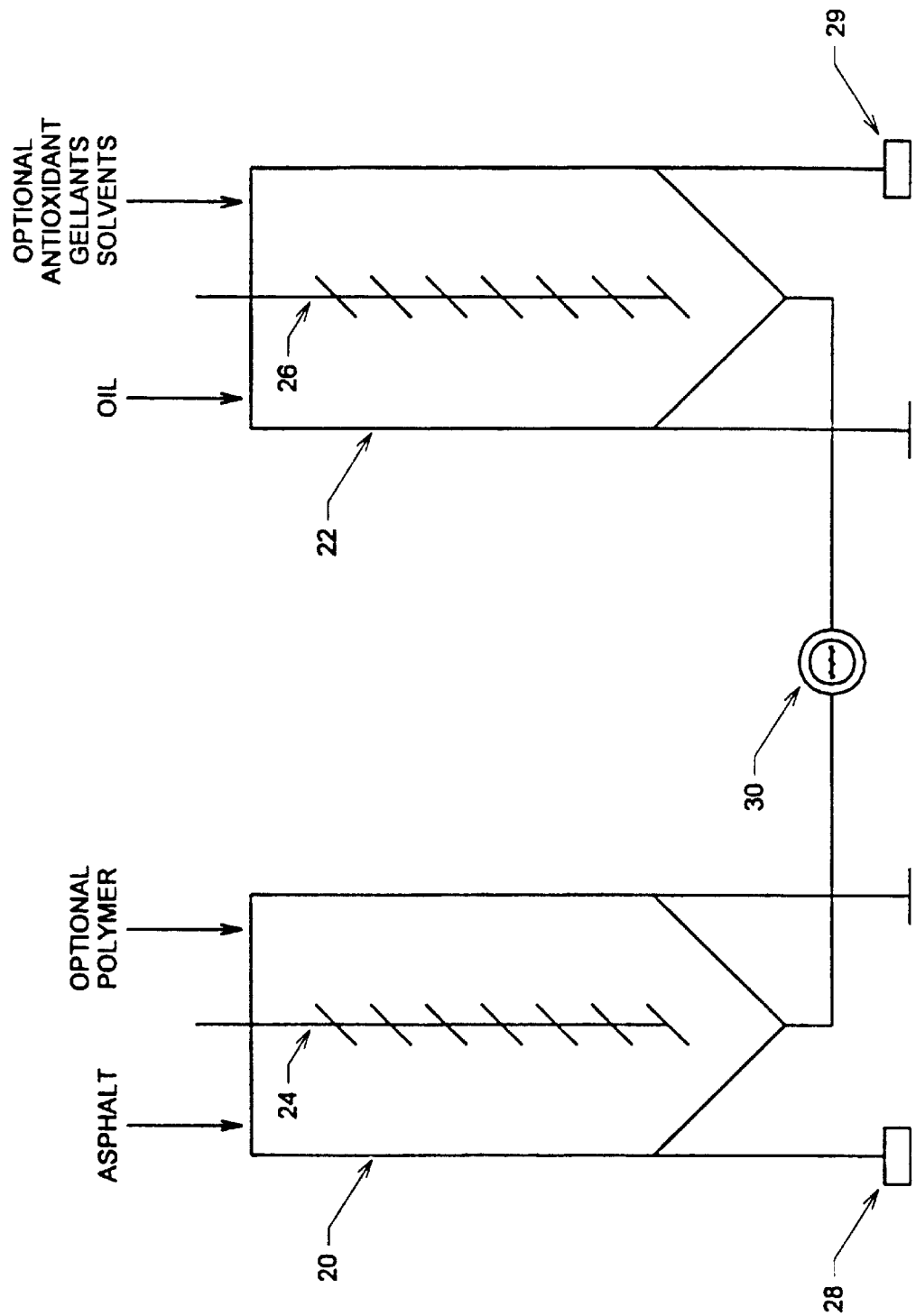
FIG. 4 shows a preferred mixing setup utilizing two separate tanks 20 and 22 which receive asphalt and oil, respectively. Tank 20 can also receive the optional polymer and tank 22 can also receive the optional antioxidant, gellants, solvents, etc. Each tank is equipped with high-shear mixers 24–26. The tanks are mounted on load-cells 28 and 29 which record the amount of each ingredients added and the contents may be circulated through a high-shear mill 30 which ensures high dispersed polymers and other ingredients and produces highly stable emulsions.
Figure 5:
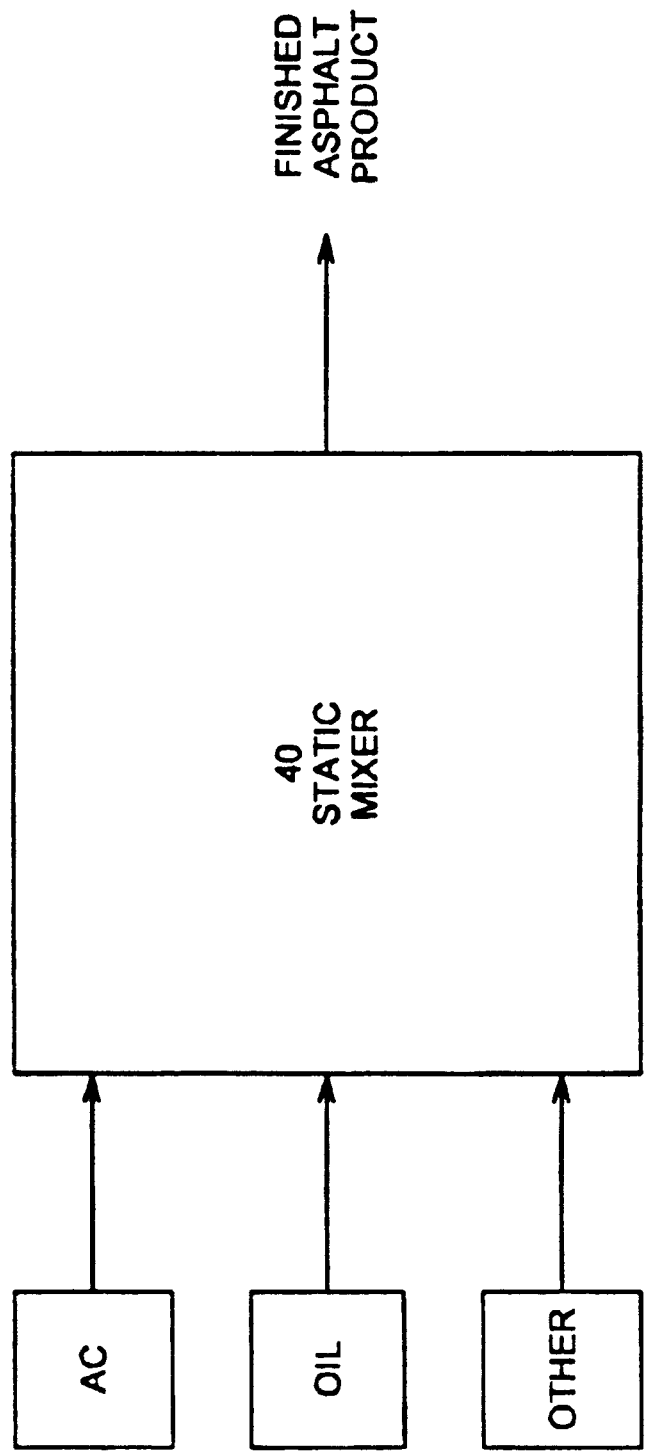
FIG. 5 shows a continuous production system in which sources of asphalt (AC) oil and other ingredients are fed to a static mixer 40 which produces the finished asphalt product continuously.

Referring to FIG. 4, to a conventional mixing kettle 10 equipped with agitators and circulation to a high shear mill 30 are added in order: 93.5 parts by weight of AC5 asphalt cement manufactured to comply with AASHTO Table 2 specifications for viscosity graded asphalt cements, 3.5 parts by weight of a styrene butadiene styrene linear triblock polymer composition manufactured by Shell Chemical Company and marketed under the Kraton® D-1101 brand name. Polymer is pre-wet into the asphalt composition under heating and mixing to 163° C. (325° F.). Once mixture is pre-wet, material is circulated through a high speed mill until all polymer has been dispersed into the asphalt cement and no particulate exists. After milling to a smooth and homogeneous dispersion, 3 parts by weight is added of a 325 hydrofinished solvent neutral oil. (The solvent neutral oil more preferably could have been added before the polymer to aid in dispersion.) This mixture is then mixed until homogeneous and stored at 149–163° C. (300–325° F.) until it is pumped from storage for use at the hot mix asphalt plant. Compositions produced according to Example 1 will meet Superpave performance graded asphalt cement requirements of PG 58-34. Actual grading of this composition at the specification limits are PG 58.5-35.6.

EXAMPLE 2

To a conventional mixing kettle equipped with agitators and circulation to a high speed mill are added 88 parts by weight of AC5 asphalt cement manufactured to meet specification limits of AASHTO Table 2 for Viscosity Graded Asphalt Cements, 6 parts by weight of a linear styrene butadiene styrene triblock polymer manufactured by Shell Chemical Company under the trade name Kraton D-1101. Polymer is pre-wet into asphalt cement under agitation and heating until reaching a temperature of 163° C. (325° F.). Once mixture is pre-wet and temperature is reached, mixture is circulated through a high shear mill until polymer is completely dispersed into the asphalt cement and no particulate exists. After milling to a smooth and homogeneous dispersion, 6 parts by weight of a 325 aromatic extract obtained from the furfural treatment process of lubricating oils are added. This mixture is agitated until homogeneous and stored at 149–163° C. (300–325° F.) until the material is pumped from storage for use at the hot mix plant. Compositions manufactured according to Example 2 have been found to meet Superpave performance asphalt binder grade (Performance Grade) PG 58-28 with actual specification limits met at PG 62.8-33.9 temperatures.

EXAMPLE 3

(Comparative PG 70-22 Blown AC)

An asphalt composition produced from vacuum distillation of crude oils meeting conventional Table 2 Viscosity Graded Asphalt Cement specifications for AC20 is oxidized at 250° C. (482° F.) until a softening point of 57° C. (135° F.) measured by ring and ball is reached. This material is found to meet PG specification grade PG 70-22 with actual specification grade limits met at PG 75.5-22.2.

EXAMPLE 4

(PG 70-22 Blown AC and Invention)

An asphalt composition produced according to Example 3 is heated until molten and sufficiently fluid to be mixed with 4 parts by weight of 325 hydrofinished solvent neutral oil produces a Superpave asphalt composition meeting the grade requirements of PG 64-28 with actual specification limits met at PG 69.8-28.1.

EXAMPLE 5

(PG 70-22 Blown AC and Cylinder Stock Comparative)

An asphalt composition produced according to Example 3 is heated until molten and sufficiently fluid to be mixed with 4 parts by weight of cylinder stock produced from the conventional refining of crude oils. Compositions according to example 5 are found to meet Superpave grading of PG 70-22 with actual grading of PG 74.7-23.4.

EXAMPLE 6

(85–100 PenAC Control Comparative)

An asphalt composition produced from the conventional refining of crude oils to produce a penetration graded asphalt cement meeting the requirements for 85–100 penetration asphalt cements. This material is found to meet the requirements of Superpave performance specification grade of PG 64-22 with actual grading of PG 64.7-26.5.

EXAMPLE 7

(85–100 PenAC Plus Flux as Comparative)

An asphalt composition produced according to Example 6 is mixed with 50 parts by weight of a flux material meeting a PG 40-34 produced from the vacuum distillation of crude oils and mixed until homogeneous. This mixture is found to meet Superpave performance binder specification requirements for a PG 52-28 with actual specification limits met at PG 54.7-30.6.

EXAMPLE 8

(85–100 PenAC Plus Invention)

A composition according to the invention comprising an asphalt composition produced as described in Example 6 is mixed with 4 parts by weight of a 325 hydrofinished solvent neutral oil mixing until composition is homogeneous at temperatures sufficiently high enough to maintain the materials in a fluid state. Mixtures produced according to this composition are found to meet Superpave performance binder specification grading requirements for PG 58-28. Actual specification limits are found to be met at PG 59.6-31.0.

EXAMPLE 9

(Invention—Using Preferred Dewaxed oil)

A composition according to the invention comprising an asphalt composition conforming to the requirements of a viscosity graded AC5 is mixed with 3 parts by weight of 325 hydrofinished solvent neutral oil mixing until homogeneous further mixing under high shear with 3 parts by weight of a linear triblock copolymer sold under the brand name, Enichem® 6302 at temperatures high enough to maintain the materials in a fluid state. Mixtures produced according to this composition are found to meet Superpave performance binder specification grading requirements for PG 58-28 with actual grading of PG 62.5-32.0.

EXAMPLE 10

(Comparative—Using Aromatic Extract)

An asphalt composition produced from vacuum distillation of crude oils meeting conventional Table 2 Viscosity Graded Asphalt Cement specification for AC5 is heated until molten and sufficiently fluid is mixes with three parts by weight of a 325 aromatic extract and mixed until homogeneous and further mixing under high shear with three parts by weight of a linear triblock copolymer sold under the brand name, Enichem® 6302 at temperatures sufficiently high enough to maintain the materials in a fluid state. Mixtures produced according to this composition are found to meet Superpave performance binder specification grading requirements for PG 58-28 with actual grading found to be PG 61.2-31.0.

EXAMPLE 11

(Invention—Example 9 Without Dewaxing the Oil)

An asphalt composition produced from vacuum distillation of crude oils meeting conventional Table 2 Viscosity Graded Asphalt Cement specification for AC5 is heated until molten and sufficiently fluid is mixed with 3 parts by weight of a 325-waxy distillate until homogeneous and further combined with 3 parts by weight of a linear triblock copolymer sold under the brand name, Enichem® 6302 at temperatures sufficiently high enough to maintain the materials in a fluid state. Mixtures produced according to this composition are found to meet Superpave performance graded binder specifications requirements for PG 58-28. Its actual grading results are found to be PG 60.3-28.8.

EXAMPLES 12–21

When various formulations are produced and tested according to the techniques of Example 1 but using the parameters set forth in Table 1, the results are as described in Table 1.

MODIFICATIONS

Specific compositions, methods, or embodiments discussed are intended to be only illustrative of the invention disclosed by this specification. Variation on these compositions, methods, or embodiments are readily apparent to a person of skill in the art based upon the teachings of this specification and are therefore intended to be included as part of the inventions disclosed herein.

Reference to documents made in the specification is intended to result in such patents or literature being expressly incorporated herein by reference.

TABLE 1

| | 1 | 2 | 3 | 4 | 5 | 6 | 7 |
|---|---|---|---|---|---|---|---|
| Reference | LB20128T | LB20020T | NB20035T | LB20067T | LB20071T | SP20026T | LB20096T |
| Invention/Comparative | INV | COMP | COMP | INV | COMP | COMP | COMP |
| FLUX (>300 PEN AC) | | | | | | | 50 |
| 85–100 PEN AC | | | | | | 100 | 50 |
| AC5 | 93.5 | 88 | | | | | |
| AC20 | | | | | | | |
| 135F S.P BLOWN AC | | | 100 | 96 | 96 | | |
| CYLINDER STOCK | | | | | 4 | | |
| AROMATIC EXTRACT | | 6 | | | | | |
| 325 WAXY DISTILLATE | | | | | | | |
| 325 HF NEUTRAL OIL | 3 | 6 | | 4 | | | |
| TEXACO HVGO REREF. | | | | | | | |
| ENPROTEC 180N REREF. | | | | | | | |
| 1101 SBS POLYMER | 3.5 | | | | | | |
| 6302 SBS POLYMER | | | | | | | |
| 401 SBS POLYMER | | | | | | | |
| MG20/40 GELLED AC | | | | | | | |
| SHRP GRADE | 58–34 | 58–28 | 70–22 | 64–28 | 70–22 | 64–22 | 52–28 |
| ACTUAL PG GRADE | 58.5–35.6 | 62.8–33.9 | 75.5–22.2 | 69.8–28.1 | 74.7–23.4 | 64.7–26.5 | 54.7–30.6 |

| | 8 | 9 | 10 | 11 | 12 | 13 | 14 |
|---|---|---|---|---|---|---|---|
| Reference | LB20099T | B2289-36-1 | B2289-36-2 | B2289-36-3 | B2289-35-2 | B2289-35-3 | B2289-35-4 |
| Invention/Comparative | INV | INV | COMP | COMP | INV | COMP | COMP |
| FLUX (>300 PEN AC) | | | | | | | |
| 85–100 PEN AC | 96 | | | | | | |
| AC5 | | 94 | 94 | 94 | 97 | 97 | 97 |
| AC20 | | | | | | | |
| 135F S.P BLOWN AC | | | | | | | |
| CYLINDER STOCK | | | | | | | |
| AROMATIC EXTRACT | | | 3 | | | 3 | |
| 325 WAXY DISTILLATE | | | | 3 | | | 3 |
| 325 HF NEUTRAL OIL | 4 | 3 | | | 3 | | |
| TEXACO HVGO REREF. | | | | | | | |
| ENPROTEC 180N REREF. | | | | | | | |
| 1101 SBS POLYMER | | | | | | | |
| 6302 SBS POLYMER | | 3 | 3 | 3 | | | |
| 401 SBS POLYMER | | | | | | | |
| MG20/40 GELLED AC | | | | | | | |
| SHRP GRADE | 58–28 | 58–28 | 58–28 | 58–28 | 52–28 | 52–22 | 52–28 |
| ACTUAL PG GRADE | 59.6–31.0 | 62.5–32.0 | 61.2–31.0 | 60.3–28.8 | 54.3–32.9 | 55.9–30.6 | 55.2–31.6 |

| | 15 | 16 | 17 | 18 | 19 | 20 | 21 |
|---|---|---|---|---|---|---|---|
| Reference | B2289-35-1 | LB20069T | LB20070T | CP20040T | LB20170T | LB20069T | LB20068T |
| Invention/Comparative | COMP | INV | INV | COMP | INV | COMP | INV |
| FLUX (>300 PEN AC) | | | | | | | |
| 85–100 PEN AC | | | | | | | |
| AC5 | 100 | | | | | | |
| AC20 | | | | | | 96 | 92 |
| 135F S.P BLOWN AC | | 96 | 96 | | | | |
| CYLINDER STOCK | | | | | | | |
| AROMATIC EXTRACT | | | | | | | |
| 325 WAXY DISTILLATE | | | | | | | |
| 325 HF NEUTRAL OIL | | | | | 3 | | 4 |
| TEXACO HVGO REREF. | | 4 | | | | | |
| ENPROTEC 180N REREF. | | | 4 | | | | |
| 1101 SBS POLYMER | | | | | | | |
| 6302 SBS POLYMER | | | | | | | |
| 401 SBS POLYMER | | | | | | 4 | 4 |
| MG20/40 GELLED AC | | | | 100 | 97 | | |
| SHRP GRADE | 52–22 | 64–28 | 64–22 | 64–22 | 64–28 | 70–22 | 70–28 |
| ACTUAL PG GRADE | 57.1–22.9 | 69.1–28.0 | 69.4–27.6 | 65.5–25.7 | 64.3–29.0 | 75.9–24.8 | 70.7–30.2 |

TABLE 2

ASPHALT MODIFICATION AGENTS

| % OFF | 325 HF NEUTRAL | 100 HF NEUTRAL | 325 AROMATIC EXTRACT | ENPROTECT 180N | TEXACO HVGO | TEXACO 93010 AE BTMS |
|---|---|---|---|---|---|---|
| IBP | 653 | 607 | 647 | 450 | 494 | 474 |
| 1% | 682 | 629 | 670 | 554 | 564 | 577 |

TABLE 2-continued

ASPHALT MODIFICATION AGENTS

| % OFF | 325 HF NEUTRAL | 100 HF NEUTRAL | 325 AROMATIC EXTRACT | ENPROTECT 180N | TEXACO HVGO | TEXACO 93010 AE BTMS |
|---|---|---|---|---|---|---|
| 5% | 749 | 668 | 737 | 690 | 667 | 718 |
| 10% | 782 | 687 | 771 | 724 | 698 | 757 |
| 15% | 802 | 700 | 792 | 744 | 716 | 783 |
| 20% | 817 | 710 | 807 | 760 | 730 | 803 |
| 25% | 829 | 721 | 819 | 774 | 743 | 820 |
| 30% | 840 | 730 | 830 | 786 | 755 | 836 |
| 35% | 850 | 739 | 840 | 797 | 766 | 851 |
| 40% | 859 | 748 | 850 | 808 | 776 | 864 |
| 45% | 868 | 757 | 859 | 818 | 787 | 878 |
| 50% | 877 | 766 | 868 | 829 | 797 | 891 |
| 55% | 885 | 776 | 877 | 840 | 807 | 904 |
| 60% | 894 | 785 | 886 | 851 | 818 | 917 |
| 65% | 902 | 796 | 895 | 862 | 829 | 930 |
| 70% | 911 | 807 | 905 | 875 | 842 | 943 |
| 75% | 921 | 819 | 915 | 888 | 855 | 958 |
| 80% | 931 | 833 | 925 | 901 | 871 | 974 |
| 85% | 942 | 850 | 937 | 916 | 889 | 990 |
| 90% | 955 | 873 | 952 | 934 | 912 | 1015 |
| 95% | 974 | 907 | 973 | 959 | 946 | 1063 |
| FBP | 1028 | 986 | 1033 | 1015 | 1030 | 1151 |

What is claimed is:

1. A paving asphalt composition comprising paving asphalt, about 0.1–20 wt. % mineral lubricating oil base stock, and polymer.

2. A composition of claim 1 comprising about 0.5–15 wt. % mineral lubricating oil base stock.

3. A composition of claim 1 wherein the mineral lubricating oil base stock is substantially free of wax.

4. An asphalt composition of claim 1 additionally containing a gellant.

5. A composition of claim 4 wherein the gellant comprises metallic soaps formed by the neutralization of fatty acids and/or rosin acids; organoclays, e.g., bentonites, kaolin clays, etc.; hydrogenated castor oils; oligomers; siloxanes.

6. An asphalt composition of claim 1 containing an antioxidant.

7. A composition of claim 6 wherein the antioxidant comprises butylated phenol and/or a metal hydrocarbyl dithiophosphate.

8. A composition according to claim 1, additionally comprising about 0.1–2.0 wt. % hydrocarbyl dithiophosphate.

9. A composition according to claim 1, additionally comprising about 0.1–5.0 wt. % of antioxidant butylated phenols.

10. A composition according to claim 1, additionally comprising about 0.1 to 12 wt. % Styrene Butadiene (SB), diblock polymers, Styrene-Butadiene-Styrene (SBS), triblock polymers which may be either linear or radial, styrene-isoprene-styrene (SIS), diblocked polymers, hydrotreated SBS, Styrene Ethylene Butadiene Styrene polymers (SEBS), Styrene Butadiene Rubber (SBR), polyacrylamide, crumb rubber, and/or glycidyl-containing ethylene terpolymer.

11. A composition according to claim 1, additionally comprising mineral spirits, kerosenes, and/or fuel oil.

12. A composition according to claim 1, additionally comprising anionic, cationic or nonanionic emulsifiers.

13. A paving asphalt composition consisting essentially of paving asphalt, mineral lubricating oil base stock and polymer.

14. A composition of claim 13 wherein the mineral lubricating oil base stock comprises solvent refined paraffinic neutral oil.

15. A pavement composition comprising aggregate and from about 1.0% to about 10.0% of a paving asphalt composition containing from about 1–10 wt. % of a low temperature stiffness-reducing amount of mineral lubricating oil base stock.

16. The composition of claim 15 wherein the mineral lubricating oil base stock comprises solvent refined paraffinic neutral oil.

17. A paving asphalt composition comprising a polymer additive reducing amount of mineral lubricating oil base stock wherein the amount of polymer additive required to obtain high temperature rutting resistance is less than if a similar amount of aromatic extract were added in place of the mineral lubricating oil base stock.

18. A composition of claim 17 comprising asphalt blended with from about 0.5–15 wt. % mineral lubricating oil base stock.

19. A process for improving the low temperature performance properties of a paving asphalt composition comprising blending with said asphalt composition, at a temperature sufficient to liquefy said paving asphalt composition, a low temperature stiffness reducing amount of mineral lubricating oil base stock.

20. The process of claim 19 conducted substantially as a batch process.

21. The process of claim 19 conducted substantially as a continuous process.

22. The process of claim 19 wherein said blending is a temperature of substantially about 35–205° C. (100–400° F.).

23. A process according to claim 19 in which the following ingredients are added in the following order: asphalt, mineral lubricating oil base stock, and then polymers.

24. A process according to claim 19, wherein the mineral lubricating oil base stock comprises waste oils, solvent neutral oils, or rerefined mineral lubricating oil base stocks.

25. A process for improving the low temperature performance properties of a paving asphalt composition comprising blending with said asphalt composition, at a temperature sufficient to liquefy said asphalt composition, from about 0.1 to about 20 wt. % of a mineral lubricating oil base stock.

26. The process of claim 25 wherein the mineral lubricating oil base stock comprises solvent refined neutral oil.

* * * * *